(12) United States Patent
Hamberger et al.

(10) Patent No.: US 6,332,733 B1
(45) Date of Patent: Dec. 25, 2001

(54) JOINT

(75) Inventors: Peter Hamberger, Stephanskirchen; August Hipper, Rohrdorf, both of (DE)

(73) Assignee: Hamberger Industriewerke GmbH, Stephanskirchen (DE)

( * ) Notice: Subject to any disclaimer, the term of this patent is extended or adjusted under 35 U.S.C. 154(b) by 0 days.

(21) Appl. No.: 09/673,512

(22) PCT Filed: Apr. 25, 2000

(86) PCT No.: PCT/DE00/01277

§ 371 Date: Nov. 30, 2000

§ 102(e) Date: Nov. 30, 2000

(87) PCT Pub. No.: WO01/48331

PCT Pub. Date: Jul. 5, 2001

(30) Foreign Application Priority Data

Dec. 23, 1999 (DE) .............................. 199 62 832
Feb. 10, 2000 (DE) ......................... 200 02 413 U

(51) Int. Cl.⁷ .................................................. F16B 21/00
(52) U.S. Cl. ..................... 403/329; 52/592.4; 52/592.1; 52/794.1; 52/309.9; 403/274; 403/300
(58) Field of Search ................... 52/480, 592.4, 52/592.1, 794.1, 309.9; 403/321, 329, 274, 282, 300, 301, 242, 353, 397

(56) References Cited

U.S. PATENT DOCUMENTS

| 1,859,667 | 5/1932 | Gruner . |
| 5,425,210 | * 6/1995 | Zafir ....................................... 52/592.4 |
| 5,678,369 | * 10/1997 | Ishikawa et al. .................... 52/592.1 |
| 5,768,850 | * 6/1998 | Chen ........................................ 52/480 |
| 6,206,278 | * 4/2001 | Tychsen ............................... 52/592.4 |

FOREIGN PATENT DOCUMENTS

| 297 10 175 U | 8/1997 | (DE) . |
| 19925867-A1 | * 12/2000 | (DE) . |
| 0 098 162 | 1/1984 | (EP) . |
| 0 855 482 A2 | 7/1998 | (EP) . |
| 9 801 986 A | 12/1999 | (SE) . |
| WO 93/13280 | 7/1993 | (WO) . |
| WO 96/27721 | 9/1996 | (WO) . |
| WO 97 27721 A | 9/1996 | (WO) . |
| WO 97/47834 | 12/1997 | (WO) . |
| WO 98/24995 | 6/1998 | (WO) . |
| WO 99 66152 A | 12/1999 | (WO) . |

OTHER PUBLICATIONS

XP002143531; Database WPI Summary; Derwent Publications Ltd.; Dec. 4, 1999.

* cited by examiner

*Primary Examiner*—Lynne H. Browne
*Assistant Examiner*—Aaron M Dunwoody
(74) *Attorney, Agent, or Firm*—Oliff & Berridge PLC

(57) ABSTRACT

A joint for two flat structural members, in particular floor panels, wherein a groove and tongue joint joining the two flat structural members is provided functionally separate from a twistlock locking the two flat structural members. The twistlock is formed on one of the structural members, the is spaced apart from the groove and tongue joint, and engages with a correspondingly formed engaging element of the other structural member. The locking is preferably formed both at the longitudinal edges and at the front edges of a rectangular structural member, such as a floor panel. The locking allows for a joint of the floor panels to occur in flat position, i.e. without twisting.

15 Claims, 3 Drawing Sheets

JOINT

BACKGROUND OF THE INVENTION

1. Field of the Invention

The invention relates to a joint for structural members, such as floor panels.

2. Description of Related Art

A joint for floor panels is for instance disclosed in EP 0 098 162 B 1. In case of this known, so-called "glue-free" joint, the adjacent circumferential edges of the panels are joined by a groove and tongue joint. There, the lower groove cheek of the one panel facing the contact face is extended beyond the vertical parting plane and comprises a locking projection at its end portion, said locking projection immersing in a corresponding recess of the tongue of the other floor panel. In order to facilitate the laying of the panels, the joint in the engaging portion of the extended groove cheek with the tongue is performed with play so that displacing of the panel along the longitudinal edges is rendered possible.

WO97/47834 A-1 shows a generic joint in which, similar to the solution described above, the lower groove cheek of a floor panel is extended beyond the vertical parting plane and is provided with a projection which engages with a corresponding clamping recess of the tongue. Contrary to the solution initially described, the engagement between the extended groove cheek and the corresponding recess of the tongue is performed such that a force is exerted by this locking which presses the two floor panels towards each other perpendicular to the vertical plane.

In both solutions described above, the groove and tongue joint has a double function. The groove and tongue joint on the one hand ensures the accurately fitting positioning of the two floor panels relative to each other so that no gaps and projections occur and the required laying quality is guaranteed. The second function consists in ensuring this predetermined relative position by the non-positive or positive locking between the extended groove cheek and the tongue even in the case of strain on the floor or of temperature and moisture fluctuations.

It is a problem with the known solutions that the extended groove cheek has to be resiliently deformed to perform the engagement between the locking elements. In the case of unfavourable conditions, for instance with excessive strain of the resilient lower groove cheek or in the case of swelling due to moisture and the influence of temperature, cracks may occur in the contact area of the lower groove cheek with the pertinent floor panel so that the groove cheek can no longer fulfil the locking function described before. In addition, the quality of the fitting of the groove and tongue joint is aggravated in the case of such cracks occurring in the contact area, so that the accuracy required for correct floor laying is no longer guaranteed.

SUMMARY OF THE INVENTION

As compared to this, it is an object of the present invention to provide a joint for structural members, in particular floor panels, in which an accurately fitting relative position is ensured with a minimum of equipment required.

Pursuant to the invention, fitting and locking are assumed by two separate structural members. Fitting is performed conventionally via a groove and tongue joint while locking is performed via a twistlock formed at a distance to the groove and tongue joint and thus being functionally independent thereof. The twistlock may be formed at the tongue-side front face or at the groove-side front face of a floor panel.

In a preferred embodiment, the twistlock is formed at a distance to the tongue and immerses in a recess at the lower, floor-side groove cheek which, contrary to the prior art, is not resilient. This means that in a preferred variant both the tongue and the twistlock are passing the vertical parting plane between the structural members in horizontal direction and are each immersing in corresponding recesses of the opposite structural member. With this variant, it is of particular advantage that substantially less material has to be removed relative to the solutions initially described, so that the shaping process for processing the front faces is facilitated.

A particularly reliable locking which is easy to be manufactured is obtained when the twistlock is provided with a recess with which a projection at the bottom of the lower groove cheek engages. The contact area between groove cheek and twistlock is preferably designed as inclined face, so that, even with relatively great tolerances, the applying of a predetermined prestress force admitting the two structural members to move towards each other is ensured.

The twistlock advantageously extends along the lower side of the structural member, so that a high-quality visible and stepping surface can be produced.

It is of very particular advantage if a groove is formed between the twistlock and the tongue, the depth of which determines the resilience of the twistlock relative to the vertical parting plane. This means that the tension forces applied by the twistlock and the extraction forces for taking apart the structural members can easily be adapted to varying ambience conditions or materials by changing the depth of this groove.

The invention may for instance be used with laminate floors having a carrier plate of high-pressure or medium-pressure wood fibers. On principle, the glue-free joint pursuant to the invention may also be used with other floors, for instance parquet floors.

Another advantage of the joint pursuant to the invention consists in that the structural members can be joined and locked with each other by sliding along the floor face. In the case of the prior art initially mentioned it is, however, necessary to first of all incline one structural member relative to the other structural member so as to insert the tongue in the groove, and to subsequently cause locking by twisting to the plane position. This means that by providing floor panels with the locking pursuant to the invention the laying of the floor can be performed in a substantially easier and quicker way.

The sliding faces along which the structural members are sliding during the locking process are preferably designed as inclined faces.

When the structural members are laid flatly side by side, preferably both the longitudinal edges and the side edges of the structural members are joined pursuant to the invention.

In addition to the locking described before, the structural members may also be glued.

Advantageous further developments of the invention are set forth in the various exemplary embodiments described herein.

BRIEF DESCRIPTION OF THE DRAWINGS

In the following, a preferred embodiment of the invention is explained in detail by means of schematic drawings.

DETAILED DESCRIPTION OF PREFERRED EMBODIMENTS

The invention will be explained in the following by means of a laminate floor.

Figure 1:
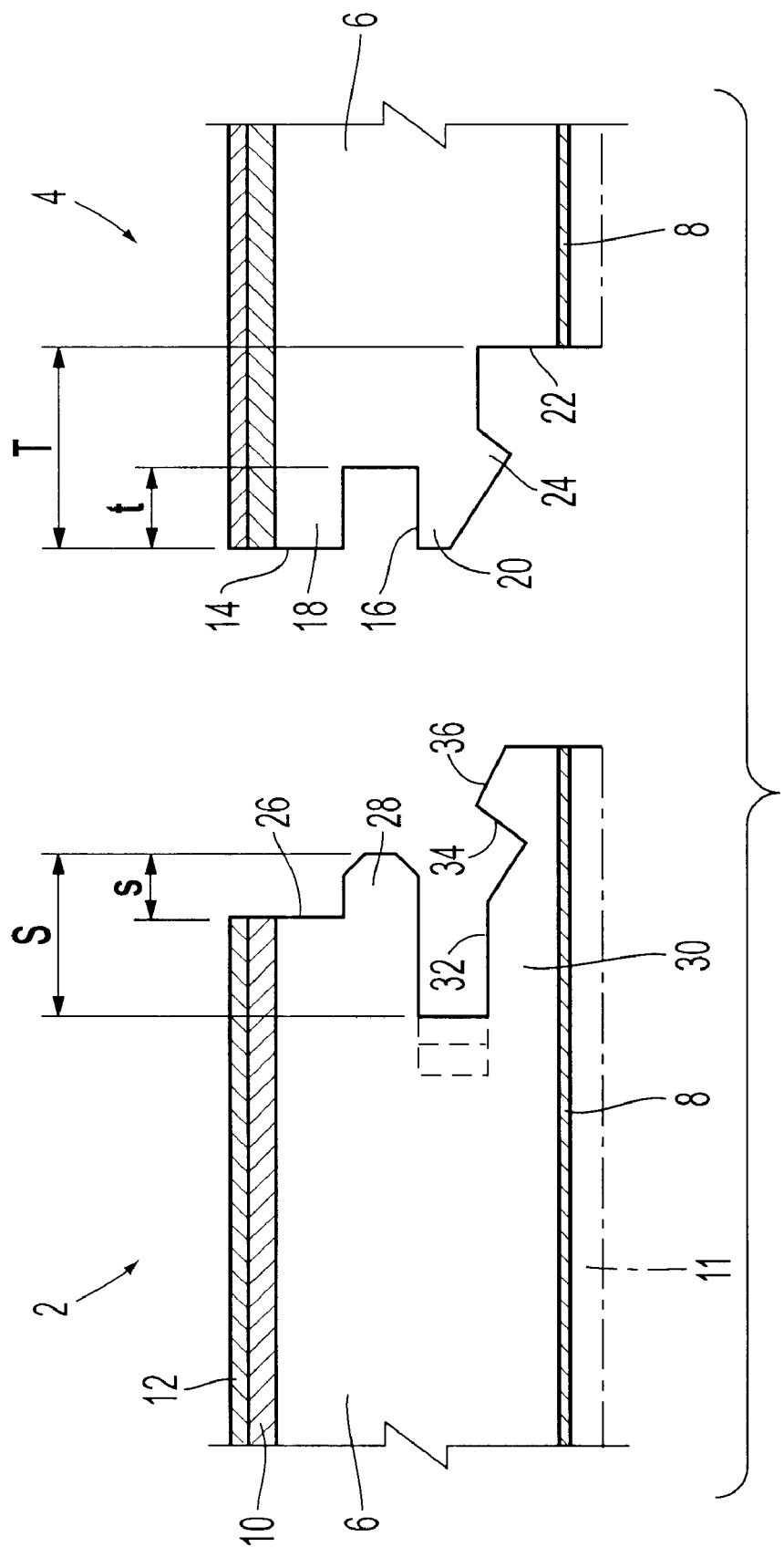
FIG. 1 illustrates the joint area of two floor panels.

Such a laminate floor consists of a plurality of floor members of which merely the joint area of two adjacent floor panels 2, 4 is illustrated in FIG. 1. Each floor panel 2, 4 of a laminate floor has a carrier plate 6—also referred to as core—consisting of high-pressure wood fibers. Such a carrier plate 6 Gensures good dimensional stability and high resistance to pressure.

The floor face of each floor panel 2, 4 is formed by a countermove laminate 8 applied to the lower overall surface of each floor panel. In the case of particular applications, a moisture insulating sheet (not illustrated) may be incorporated. This countermove laminate 8 further increases the dimensional stability of the flooring material. As is illustrated in dot and dash in FIG. 1, a dead-sounding layer 11 for insulating structure-borne noise may be applied at the bottom of each floor panel 2, 4. The dead-sounding layer may be formed of conventional insulating materials, such as for instance polyurethane foam etc.

The visible surface of the floor panels 2, 4 is formed by a decorating laminate 10 and a cover layer 12 applied thereupon. The decorating laminate 10 is manufactured by printing and gives the floor an appearance that comes extremely close to the structure of natural wood floors. The cover layer 12 provides for the necessary robustness and wear resistance of the flooring material.

In the front face 14 of the floor panel 4 illustrated in FIG. 1, a rectangular groove 16 is formed which is limited by a higher groove cheek 18 and a lower groove cheek 20.

The lower portion of the groove cheek 20 which is spaced apart from the groove 16 is provided with a recess 22, the depth T of which his greater than the depth t of the groove 16. The remaining wall thickness of the groove cheek 20 is so great that its resilient deformation during the joint of the panel is practically negligible. At the lower side of the groove cheek 20 a projection 24 is provided which extends in the direction of the floor face of the floor panel 4. The side faces (perpendicular to the drawing plane) of the projection 24 are formed by inclined faces.

The front face 26 of the adjacent floor panel 2 is of corresponding construction. Accordingly, a tongue 28 corresponding to the groove 16 projects from the front face 26. The groove and tongue joint formed by the groove 16 and the tongue 28 corresponds to the joint of the conventional laminate floors which are, for instance, joined by gluing only. In the area of the floor face of the floor panel 2, a twistlock 30 is formed which is separated from the tongue 28 via a front recess 32. This means that the side walls of the front recess 32 are on the one hand limited by the twistlock 30 and on the other hand by the tongue 28. The depth S of the front recess 32 is greater than the length s of the tongue 28—i.e. the groove bottom is displaced inwardly relative to the front face 26. By varying the depth S, the resilience of the twistlock 30 can be adjusted so that the extraction forces for dismounting the floor can be adapted.

The major area of the twistlock 30 which is spaced apart from the front recess 32 extends in prolongation of the floor face of the floor panel 2. In the face of the twistlock 30 facing the front recess 32, a notch 34 is provided which—as will be described in detail in the following—is engageable with the projection 24 of the recess 22 and is formed approximately below the front face of the tongue 28.

The front face of the twistlock 30 is provided with an inclined sliding face 36 which facilitates the joint of the floor panels 2, 4 in interaction with the adjacent inclined face of the projection 24.

For joining the floor panels 2, 4, the projection 24 slides on the sliding face 36 and the tongue 28 immerses in the groove 16. In this relative position, the lower groove cheek 20 in turn immerses in the front recess 32.

Figure 2:
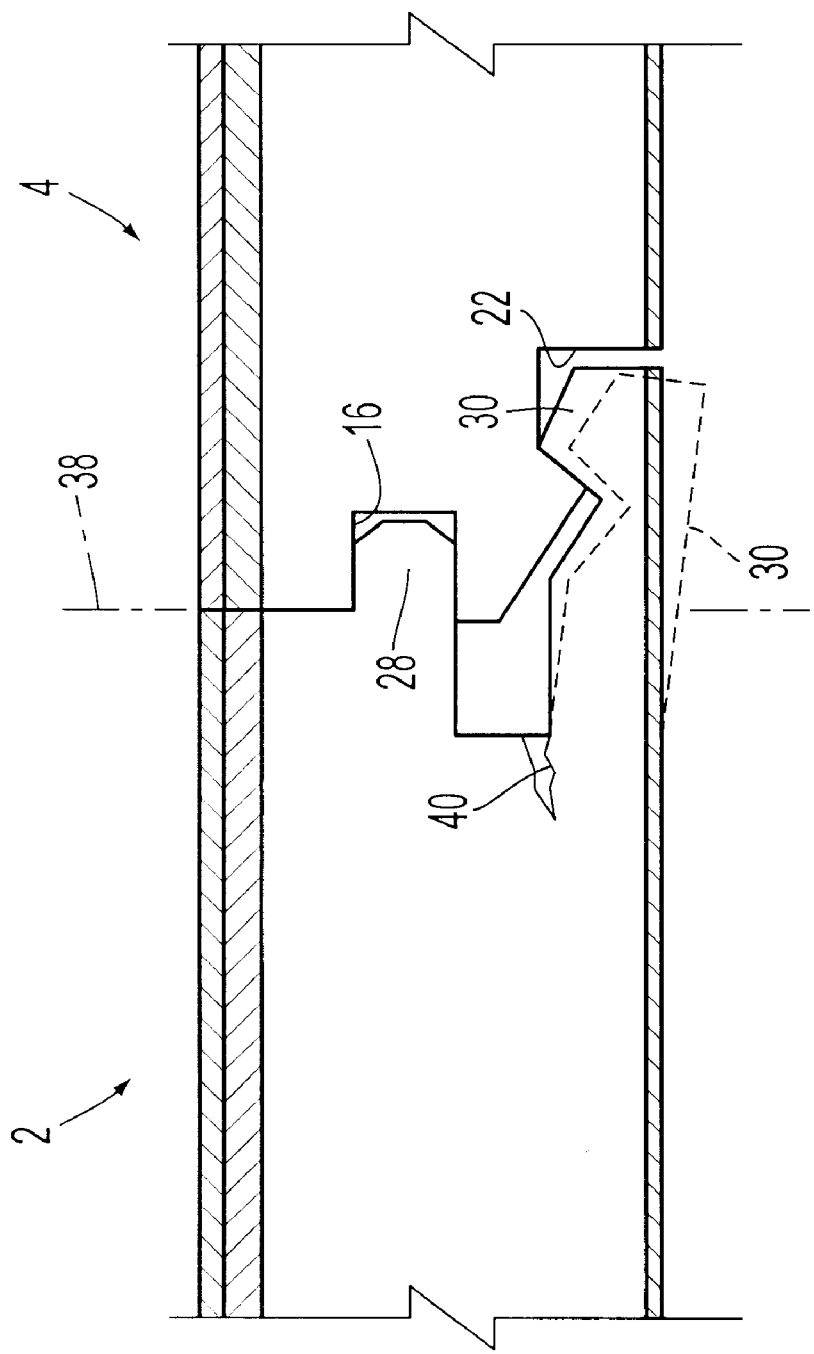
FIG. 2 illustrates the floor panels of FIG. 1 in the joined state.

On further shifting of the floor panel 4 relative to the floor panel 2, the twistlock 30 is resiliently deflected downwards due to the transversal force introduced via the inclined sliding face 36 (FIG. 2, illustration in dot and dash). The sliding face 36 slides along the projection 24 until the latter catches with the notch 34. In this state, the twistlock 30 engages the projection 24, the contact between these two structural members merely being performed along the inclined faces formed at the right side in FIG. 2 while the inclined faces positioned at the left side are spaced apart from each other.

The position of the projection 24 and of the notch 34 is chosen such that the two front faces 14, 26 are flatly pressed against each other in the locked state, so that the gap in the front face area between the two floor panels 2, 4 is minimal. The front face of the twistlock 30 is spaced apart from the adjacent front face of the recess 22. Since the depth S of the front recess 32 is greater than the length s of the tongue 28, the bottom of the front recess 32 is also spaced apart from the front face 14 of the floor panel 4 forming the parting plane 38 (FIG. 2, illustration in dot and dash).

The orientation of the floor panels 2, 4 in vertical direction is performed alone by the groove and tongue joint 28, 16, while the locking and pressing of the floor panels 2, 4 is performed alone by the twistlock 30 interacting with the projection 24, and thus depends on the resilience of the twistlock 30. This can be changed by varying the depth S of the front recess 32 (indicated by broken lines in FIG. 1), so that the resilient deflection of the twistlock 30 and the locking force can easily be adapted as a function of the choice of material and of the conditions of use of the floor.

Even if, in the case of unfavourable conditions, for instance with an overstraining of the twistlock 30, a crack occurs in the area indicated with reference numeral 40, no offset in height has to be feared since the fitting between the groove 16 and the tongue 28 remains unimpaired while at most the locking forces are reduced.

With the conventional solutions, due to the double function of the groove and tongue joint, both the locking and the fitting between the floor panels are neutralized when the lower groove cheek breaks. The invention thus constitutes a substantial improvement of conventional glue-free joints, so that an accurately fitting laying of the floor is guaranteed even with highest strains and even in the case of mistakes in laying.

Figure 3:
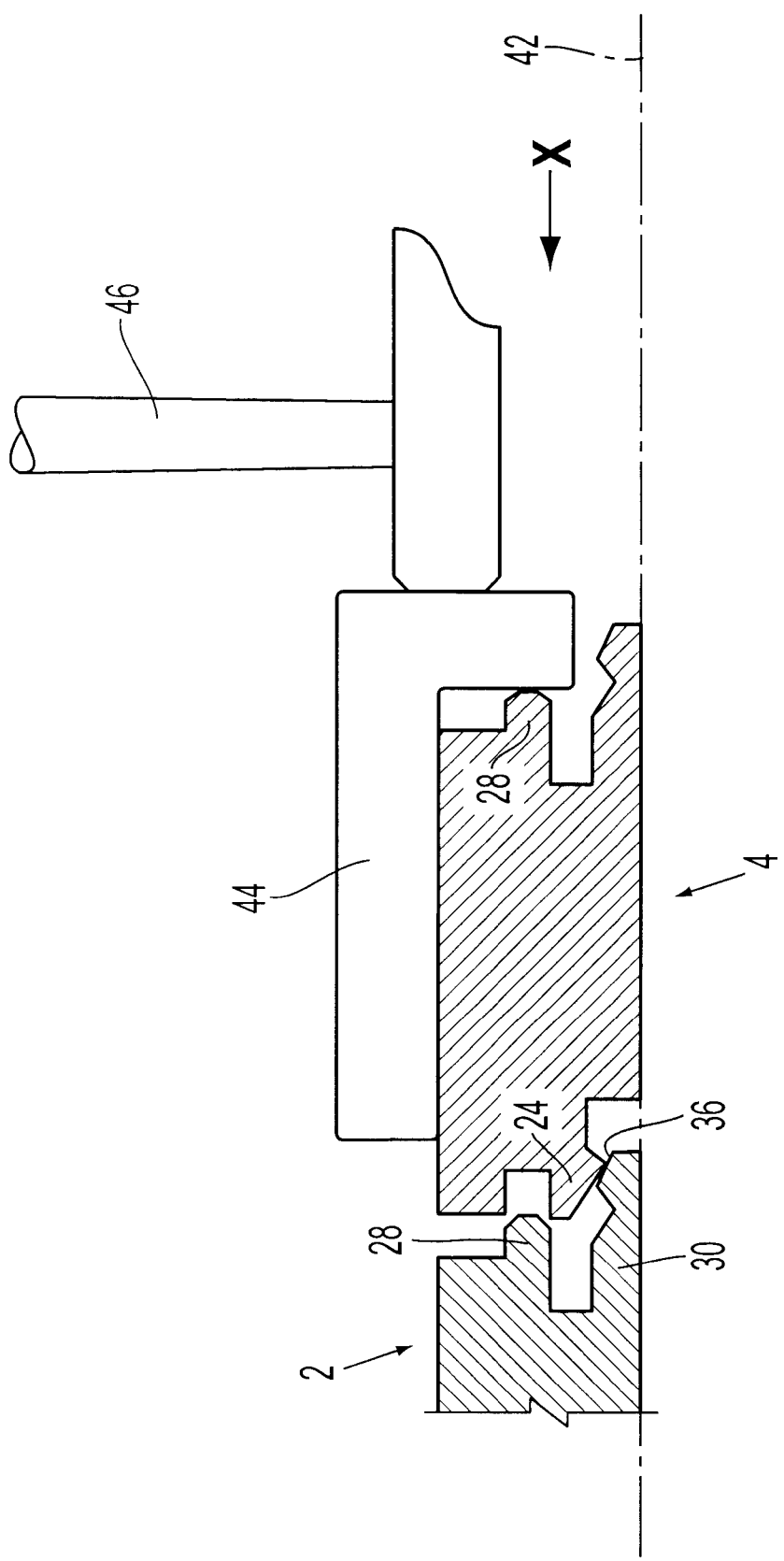
FIG. 3 illustrates a representation to explain the laying process.

The method of laying the floor panels 2, 4 as constructed pursuant to the invention is explained in the following by means of FIG. 3. It is assumed that one or several floor panels 2 (4) have already been laid on a floor 42 indicated with in dot and dash, with merely the longitudinal side of the panel incorporating the tongue 28 and the twistlock 30 being illustrated in FIG. 3. The floor panel 4 to be added also is placed flatly on the floor 42 and is then shifted in X-direction (arrow in FIG. 3) until the inclined face 36 gets into contact with the projection 24. Subsequently, a striking block 44 is applied which has a more or less L-shaped cross-section and which rests with its longer leg on the upper side of the floor panel 4 while the shorter leg at least partially encompasses the right front face of the floor panel in FIG. 3, so that this short leg is in contact with the tongue 28.

By slight strokes with a hammer 46 on the striking block 44 in the direction of the floor panel 2 already laid, the engagement of the locking elements is performed as illustrated in FIG. 2.

The orientation in longitudinal direction of the panels subsequently is performed by applying the striking block 44 to the narrow side. By applying strokes, the floor member 4 can be shifted along the longitudinal side of the panels that have already been laid, until the narrow sides are locked with each other.

It is essential that the concept pursuant to the invention allows for the floor panels 2, 4 to be joined in flat position, i.e. without twisting. Such twisting was necessary with the prior art as initially described. The measures pursuant to the invention thus substantially facilitate laying, so that laying work may also be performed by a non-professional person.

In order to enable a particularly reliable joint of the floor panels 2, 4, joint by gluing may be performed in addition to the locking as explained. This gluing is preferably effected in the groove and tongue area.

Another particular advantage of the construction pursuant to the invention is that the twistlock 30 is formed flush at the lower side of the floor panels 2, 4, so that a flat contact is guaranteed. Since the groove and tongue joint and the locking are provided independently of each other, the two floor panels 2, 4 are guided exactly by the groove and tongue joint during the locking process already. With the prior art initially mentioned, the lower groove cheek which simultaneously forms the locking member is resiliently deflected during the locking process, so that the precise guiding of the locking process pursuant to the invention is not possible.

Since no twisting is required with the locking pursuant to the invention, it remains left to the person laying the panels whether he will first join the long sides or the narrow sides of the floor panels. In the case of locking which requires twisting, the adjacent floor panels first had to be joined along the narrow sides, and subsequently this long board consisting of a plurality of individual floor panels had to be twisted to engage with the floor panel already laid. This is substantially more awkward since the aligning of such long boards is much more difficult than the successive laying of short floor panels.

With the embodiment described before, the twistlock 30 is formed at the same floor panel 2 as the tongue 28. In kinematic reversal, the twistlock 30 could also be formed at the floor panel 4 provided with the groove 16, this, however, necessitating the removal of some more material in order to cut the front face free.

Instead of locking via inclined faces, other geometries, for instance rounded faces, vertical faces, etc. could also be used. It may on principle also be imagined to manufacture the twistlock 30 from some other material and to fix it to the panel.

What is disclosed is a joint for two flat structural members, in particular floor panels, wherein a groove and tongue joint is provided functionally separate from locking. This locking is effected by a twistlock of a structural member, said twistlock being spaced apart from the groove and tongue joint and engaging with a correspondingly formed engaging element of the other structural member. The locking is preferably formed both at the longitudinal edges and at the front edges of a rectangular structural member, for instance of a floor panel. The locking allows for a joint of the floor panels in flat position, i.e. without twisting.

What is claimed is:

1. A joint for plate-shaped structural members, for instance floor panels, comprising a groove and tongue joint passing a parting plane between two adjacent structural members, and a locking for fixing the relative position determined by said groove and tongue joint, the locking comprising a twistlock formed on one of the structural members and separated from said groove and tongue joint, said twistlock being positively or non-positively engageable with an engaging element on the other structural member, said tongue and said twistlock being provided on the same structural member and a front recess being formed between said tongue and said twistlock, the front recess extending inwardly into said same structural member relative to said parting plane.

2. The joint according to claim 1, wherein said twistlock is provided at a distance to the tongue on one structural member and wherein the engaging element is provided at a distance to the groove on the other structural member.

3. The joint according to claim 2, wherein said twistlock is provided at a floor side.

4. The joint according to claim 1, wherein said twistlock is provided at a floor side.

5. The joint according to claim 1, wherein a notch is formed at a face of said twistlock facing said tongue, said notch having a correspondingly formed projection of the engaging element as a counterpart.

6. The joint according to claim 5, wherein said notch and said projection both are delimited by inclined faces.

7. The joint according to claim 6, wherein the depth of said front recess is chosen as a function of the desired extraction force for separating the structural members.

8. The joint according to claim 5, wherein the depth of said front recess is chosen as a function of the desired extraction force for separating the structural members.

9. The joint according to claim 1, wherein the engagement between said twistlock and said engaging element is chosen such that a tension force is acting, pressing said floor members together.

10. The joint according to claim 9, wherein the depth of said front recess is chosen as a function of the desired extraction force for separating the structural members.

11. The joint according to claim 1, wherein the joint is provided at long and narrow sides of a floor panel.

12. The joint according to claim 11, wherein the depth of said front recess is chosen as a function of the desired extraction force for separating the structural members.

13. The joint according to claim 1, wherein the depth of said front recess is chosen as a function of the desired extraction force for separating the structural members.

14. The joint according to claim 1, wherein glue joining of the structual members is performed in addition to the positive or non-positive engagement.

15. The joint according to claim 1, wherein a dead-sounding layer is provided at a floor face.

* * * * *